Sept. 25, 1945.   L. B. SALISBURY   2,385,544
MOLDING DEVICE
Filed May 19, 1943
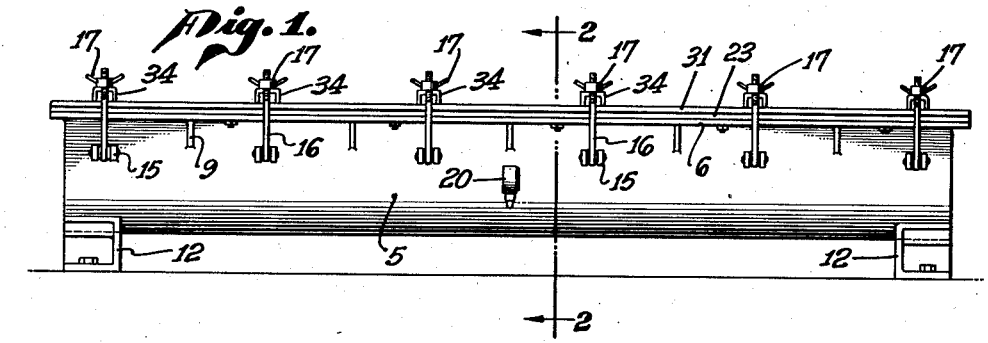
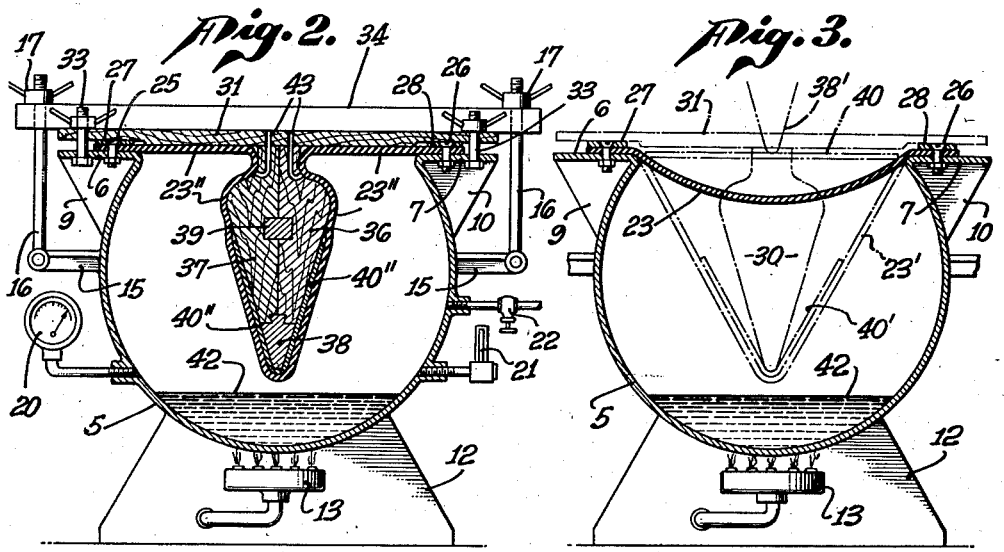
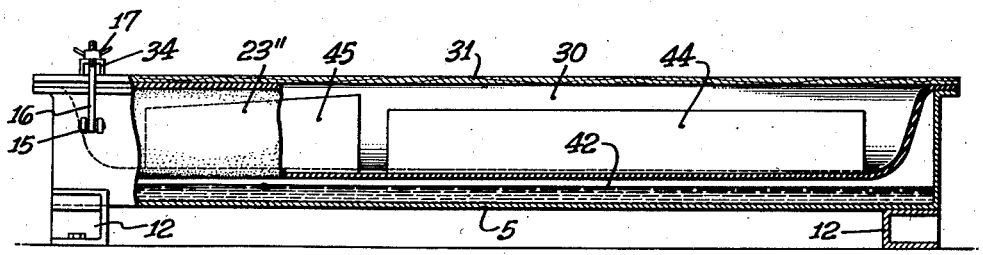
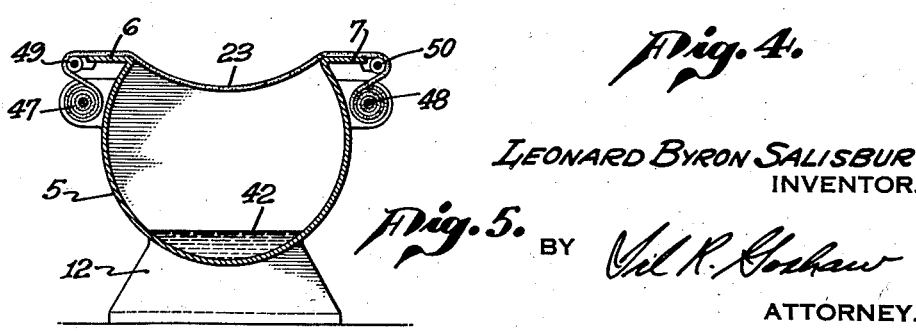
LEONARD BYRON SALISBURY,
INVENTOR.
BY
ATTORNEY.

Patented Sept. 25, 1945

2,385,544

UNITED STATES PATENT OFFICE 2,385,544

MOLDING DEVICE

Leonard Byron Salisbury, La Crescenta, Calif.

Application May 19, 1943, Serial No. 487,567

7 Claims. (Cl. 144—281)

This invention relates to methods of and means for manufacturing laminated plywood and plasticized wood structures, and particularly to a device or system for forming and molding various types of sub-structures such as aircraft trimming tabs, ailerons, and wings, as disclosed and claimed in my copending application Serial No. 482,557, filed April 10, 1943.

Certain methods of molding plywood veneers are well-known, such methods employing both male and female pressure molds, and either a male or female mold with elastic forms containing air, above or below atmospheric pressure depending upon the process, to provide the necessary molding pressure. When sharp or small radius structures are to be constructed, it is difficult with the prior methods to form or shape the plywood into the desired angles and apply uniform pressure at all points over the entire surface. This is particularly true at the sharp bends where the curvature must be "worked" into the plywood veneers by hand to provide an even distribution of the bonding glues. After shaping and forming, the molds and plywood are left to set, which requires in the neighborhood of 8 hours to obtain a satisfactory structure when using certain mechanical pressure types of molding processes where no heat is applied.

The present invention is directed to a system which is particularly adapted to forming small radius structures by automatically shaping the plywood over the small radius portion of the male mold and then applying controlled air pressure to wrap the plywood around the remaining portion of the mold and maintain it in uniform contact therewith. The temperature of the air, mold, and plywood is readily controllable in the present system so that it may be raised to the optimum value in accordance with the type of wood and structure being molded. In a practical application of the invention, yellow poplar and spruce plywood veneer trimming tabs have been molded in 7.2 minutes at a temperature of 140° Fahrenheit and from 100 to 150 pounds pressure per square inch. This is not only a considerable reduction in time over the former 8-hour period mentioned above for mechanical pressure molds, but superior structures were obtained.

The principal object of the invention, therefore, is to facilitate the molding of plywood veneer forms and structures.

Another object of the invention is to provide an improved method of molding small radius plywood veneer structures and forms.

A further object of the invention is to provide a plywood veneer molding device or system in which the pressure and temperature is externally and uniformly applied.

A further object of the invention is to provide a plywood veneer molding process and system which automatically shapes the plywood into the final structure, the preliminary shaping being accomplished during the setting up period.

Although the novel features which are believed to be characteristic of this invention will be pointed out with particularity in the appended claims, the manner of its organization and the mode of its operation will be better understood by referring to the following description read in conjunction with the accompanying drawing forming a part hereof, in which:

Fig. 1 is a plan side view of the molding system embodying the invention.

Fig. 2 is a cross sectional view of the tank taken along the line 2—2 of Fig. 1 and showing a structure in molding position.

Fig. 3 is a cross sectional view similar to Fig. 2 illustrating an intermediate step in the molding process.

Fig. 4 is a partial cross sectional view, longitudinally of the tank, showing two structures being simultaneously molded, and, Fig. 5 is a cross sectional view similar to Figs. 2 and 3 showing a modification of the system.

Referring now to Figs. 1 to 4, inclusive, of the drawing in which like numerals are applied to identical elements, a substantially cylindrical tank 5, preferably of metal, has an upper longitudinal opening along its entire length, the opening extending between horizontal flanges 6 and 7 supported by ribs 9 and 10, respectively. The tank 5 is mounted on an open base 12 under which a gas or other suitable heating element 13 is positioned. Clamp supports 15 are welded or otherwise attached to the sides of the tank for anchoring the ends of clamp rods 16 having hand nuts 17. A pressure gage 20 is provided at one side of the tank and a temperature gage 21 is provided at the other side although these gages may be in any desirable position. An air inlet valve 22 is shown for admitting air under pressure as will be described hereinafter.

Suspended across the entire opening between flanges 6 and 7 is an elastic rubber sheet shown in normal rest position at 23 in Fig. 3. The sheet 23 is fastened to the flanges 6 and 7 by any suitable means such as screw bolts 25 and 26 which pass through bearing strips 27 and 28, so that an air tight seal is formed. This seal also extends across the ends of the tank. The male mold shown, to illustrate the invention, is one of the types used for forming the trimming tabs disclosed in my above-mentioned copending application. This male mold is shown at 30 with its neck secured to a cover strip 31 which extends the width and length of the tank opening and which is clamped over the rubber sheet 23 by clamps 33 passing through the flanges 6 and 7. Other suitable fastening means may be employed. The male mold support 31 is held tightly in position by U-beams 34 having slotted ends to accommodate the clamp rods 16. The tightening of hand nuts 17 insures an airtight seal within the tank when subjected to pressure.

Referring again to the male mold 30, this member is constructed of two wooden sections 36 and 37 (see Fig. 2) with a Ceromatrix metal tip 38 and a rectangular center reinforcing section 39 made of the same material. Such a mold structure is rugged and will withstand the necessary molding pressures and temperatures without warping although other suitable mold structures may be employed. The ends of the mold are rounded as shown in Fig. 4. The metallic tip provides the necessary hardness to form the small radius section of the structures as will now be described.

Referring first to Fig. 3, before the mold 30 and its support 31 are placed in the position shown, the rubber sheet is as shown at 23. Upon this sheet a plywood veneer strip of sufficient size to form the skin of a trimming tab is placed, as shown at 40. The tip 38 of mold 30 is then placed along the center of the veneer, as shown at 38', and the mold 30 forced into the tank 5, the rubber sheet resisting the entrance of the mold and the veneer strip until the rubber sheet and the veneer reach their positions, as shown at 23' and 40', respectively. The resistance offered by the resiliency of the rubber shapes the small radius section of the tab by a wiping motion which provides a superior structure to that obtainable by hand forming, since this type of wiping motion uniformly spreads the glue or other plastic bonding agent between the veneers, thereby eliminating excess glue or glue pockets at the sharp bend of the structure.

When the mold 30 and veneer 40 are as shown in Fig. 3, the clamps 33 are tightened and then the U-beams are positioned and clamped. The gas burner 13 is then lighted, or other suitable heat source energized, to heat the water 42 to the molding and curing temperature desired, such as 140° Fahrenheit, it being understood that the water may be also kept at this temperature during the non-molding periods, since it is solely a radiation element. It is also possible to obtain the desired temperature without water by using controllable heating elements of the electrical type. The molding and curing temperature will vary in accordance with the type of glues, hot setting glues requiring higher temperatures than the cold setting glues.

Compressed air is now admitted to the tank through valve 22 and as the pressure increases within the tank, the rubber sheet will wrap the plywood around the mold 30 from the tip 38 upwardly, until the plywood and rubber appear as shown at 23'' and 40'' in Fig. 2. This pressure application continues the even distribution of the bonding agent. By the gages 20 and 21, the optimum pressure and temperature are indicated. To insure that no air bubbles may exist between the veneer, mold, and rubber sheet as the veneer is wrapped around the mold, small air exits 43 are provided in the neck of the mold. By this process, yellow poplar and spruce trimming tabs have been molded in 7.2 minutes, as compared to 8 hours required by a former mechanical process, with the quality of the structure being much superior to the quality of those made by the former mechanical method, for the reasons mentioned above.

The tank 5 may be any size or shape, depending upon the size of the structures or elements to be molded, it being possible with a larger tank to simultaneously mold several different types of structures or several structures of the same type. As shown in Fig. 4, a long rectangular tab or aileron 44 is shown in the tank with a trapezoidal tab 45, the male mold being so constructed as to permit the molding of these tabs simultaneously.

As mentioned above, the wiping action of the rubber sheet 23, in wrapping the plywood veneers around the tip 38 of the mold 30, has been found to permit excellent results to be obtained for small radius sections such as the trailing edges of tabs and ailerons. Another method of and means for obtaining this action is shown in Fig. 5. In this modification, a rubber sheet similar to sheet 23 or a canvas or cloth sheet, treated to be airtight, is wrapped around spring rollers 47 and 48. The sheet passes over rollers 49 and 50 at the edges of flanges 6 and 7, while the tension in the rollers may be adjustable to provide the required wiping action in accordance with the thickness of the veneers being used.

Although one general type of mold 30 has been illustrated, it is to be understood that other shapes of molds having concave and convex sides can also be used in the above process, the air pressure forming the veneers to the exact surface configurations of the various molds. Also, the plywood 40, 40' and 40'' as shown in Figs. 2 and 3 may have longer sides which will wrap around the curved shoulders of mold 30 to form the exact trimming tab form disclosed in my above mentioned copending application. Wider sheets of plywood will, of course, extend across the opening of the tank but the same wiping action occurs between the mold 30 and sheet 23 when the mold is inserted in the tank 5.

I claim as my invention:

1. In combination, a tank having an opening therein, a resilient flexible member positioned across the opening in said tank, and attached to the edges of said opening in said tank, a cover adapted to be positioned over said opening, a mold attached to said cover, said mold being adapted to be inserted in said tank for partially shaping material to be molded between said flexible member and said mold, and means for applying pressure between said tank and said flexible member for shaping said material in its final form around said mold, the greatest pressure being exerted upon the material positioned at the deepest point in said tank.

2. A combination in accordance with claim 1 in which the tension of said flexible member is added to the pressure applied between said tank and said flexible member, and an exit in said mold to permit the exit of air from between said material, said mold and said cover as said material and flexible member approach said mold.

3. In combination, a tank having an opening therein, a resilient flexible member positioned across the opening in said tank, a cover adapted to be positioned over said opening, a mold attached to said cover, said mold being adapted to be inserted in said tank for partially shaping material to be molded between said flexible member and said mold, and means for applying pressure between said tank and said flexible member for shaping said material in its final form around said mold, the greatest pressure being exerted upon the material positioned at the deepest point in said tank, said flexible member being a rubber sheet attached to the edges of the opening in said tank.

4. A molding device comprising a tank having an opening therein, a resilient flexible member extending across said opening and connected to the edges of said opening of said tank, a rigid mold having a substantial section with a relatively sharp curvature, a cover for said opening to which said mold is attached, material to be molded being positioned between said resilient member and the sharp curved portion of said mold and being partially shaped by the tension of said resilient member when said cover is placed over said opening, and means for creating pressure greater than atmospheric within the area between said flexible member and the interior surface of sand tank for continuing the shaping of said material over the remaining portion of said mold.

5. A molding device in accordance with claim 4 in which conduits are provided in said mold to permit exit of the air in the space between said mold, said cover, and said resilient member.

6. A molding device comprising a substantially cylindrical elongated tank having a longitudinal opening therein, a rigid mold around which wooden material is adapted to be molded, a cover for said tank to which said mold is attached, a resilient member extending across the opening of said tank and attached to the edges of said opening in said tank, said material being located between said mold and said resilient member, said mold being adapted to be inserted within said tank when said cover is placed on said tank, the resiliency of said resilient member partially forming said material, and means for generating a pressure greater than atmospheric in said tank for shaping said wooden material around said mold.

7. A molding device in accordance with claim 6, in which conduits are provided in said mold for passing air trapped between said wooden material and said mold.

LEONARD BYRON SALISBURY.